United States Patent
Adamson et al.

(10) Patent No.: US 9,452,674 B2
(45) Date of Patent: Sep. 27, 2016

(54) WORK VEHICLE HAVING A COOLING SYSTEM WITH A REVERSIBLE AIRFLOW

(71) Applicant: CNH America LLC, New Holland, PA (US)

(72) Inventors: William H. Adamson, Naperville, IL (US); Daniel A. Morey, Mundelein, IL (US); Nicholas J. Prenger, Palos Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 249 days.

(21) Appl. No.: 13/711,153

(22) Filed: Dec. 11, 2012

(65) Prior Publication Data

US 2013/0146377 A1   Jun. 13, 2013

Related U.S. Application Data

(60) Provisional application No. 61/570,051, filed on Dec. 13, 2011.

(51) Int. Cl.
*B60K 11/06* (2006.01)
*B60K 11/02* (2006.01)

(52) U.S. Cl.
CPC .............. *B60K 11/06* (2013.01); *B60K 11/02* (2013.01); *B60Y 2200/221* (2013.01)

(58) Field of Classification Search
CPC ....... B60K 11/04; B60K 11/08; B60K 11/06; B60K 11/00; B60K 11/02; F01P 2005/025; F01P 3/18; F01P 2001/005; F01P 2003/185; F01P 2005/046; F01P 2060/02; F01P 2070/52; F01P 5/06; F01P 11/10; F01P 11/12; F01P 5/02; F02B 63/04; F02B 37/00; B60R 13/0838; B60R 13/0884; F01N 13/011; F01N 2450/30; F01N 2450/40; F01N 2590/08; F01N 3/0256; F01N 3/055
USPC ............................ 180/68.1, 68.2, 68.3, 68.4
See application file for complete search history.

(56) References Cited

U.S. PATENT DOCUMENTS

| | | | | |
|---|---|---|---|---|
| 2,703,075 | A * | 3/1955 | Sanders | F01P 5/02 123/41.49 |
| 2,729,202 | A * | 1/1956 | Sanders | F01P 11/10 123/41.04 |
| 3,868,992 | A * | 3/1975 | Getz | B60K 11/04 165/122 |
| 4,081,050 | A * | 3/1978 | Hennessey | B60K 11/04 180/233 |
| 4,086,976 | A * | 5/1978 | Holm | B60R 13/0838 123/41.49 |
| 4,341,277 | A * | 7/1982 | Adamson | B60K 11/08 180/68.1 |
| 4,371,047 | A * | 2/1983 | Hale | B60H 1/00378 123/41.7 |

(Continued)

FOREIGN PATENT DOCUMENTS

DE           2437995 A1 *  2/1976   ......... B60R 13/0838

*Primary Examiner* — John Walters
(74) *Attorney, Agent, or Firm* — Rebecca L. Henkel (57) ABSTRACT

A work vehicle includes an engine and a hood enclosure at least partially surrounding the engine. The hood enclosure may include a front grille and a secondary grille spaced apart from the front grille. The hood enclosure may also at least partially define an airflow compartment. The work vehicle may also include a heat exchanger disposed in the airflow compartment between the front grille and the engine and at least one cooling fan disposed in the airflow compartment between the heat exchanger and the engine. The at least one cooling fan may generally be configured to generate a reversible airflow within the airflow compartment between the front grille and the secondary grille.

17 Claims, 5 Drawing Sheets

(56) References Cited

U.S. PATENT DOCUMENTS

| | | | | |
|---|---|---|---|---|
| 4,454,926 A * | 6/1984 | Akins | ............... | B60K 11/08 123/41.7 |
| 2004/0226683 A1 * | 11/2004 | Esposito | ............ | B60K 11/04 165/41 |
| 2005/0006048 A1 * | 1/2005 | Vuk | ............... | B60K 11/04 165/41 |
| 2007/0051326 A1 * | 3/2007 | Bering | ............... | F01P 5/06 123/41.71 |
| 2011/0011665 A1 * | 1/2011 | Peterson | ............ | F01N 3/055 180/309 |

* cited by examiner

WORK VEHICLE HAVING A COOLING SYSTEM WITH A REVERSIBLE AIRFLOW

CROSS REFERENCE TO RELATED APPLICATIONS

This application claims priority from and the benefit of U.S. Provisional Patent Application No. 61/570,051, entitled "Work Vehicle Having A Cooling System With A Reversible Airflow," filed Dec. 13, 2011, which is hereby incorporated by reference in its entirety.

FIELD OF THE INVENTION

The present subject matter relates generally to work vehicles and, more particularly, to a work vehicle having a cooling system configured to reverse the direction of the airflow through a heat exchanger(s) of the cooling system.

BACKGROUND OF THE INVENTION

Current cooling systems for work vehicles, such as tractors, generally include one or more heat exchangers and a fan configured to pull air through the heat exchanger(s) from a location outside the work vehicle. Typically, these cooling systems are only designed to work in one direction, whereby the fan generates an airflow that is directed into the work vehicle through its front grille and is exhausted from the work vehicle at its rear. Thus, when the work vehicle is moving in its normal, forward direction of travel (i.e., when the front grille is facing the direction of travel), air is pulled through the front grille and past the heat exchanger(s) in the vehicle's direction of travel. As a result, the temperature of the air entering the front grille is generally the same as the temperature of the ambient air out in front of the vehicle. However, when the work vehicle is moving in the reverse direction (i.e., when the front grille faces away from the direction of travel), the air entering the front grille typically includes some of the hot air that was previously directed past the vehicle's engine. As a result, the air flowing into the front grille and through the heat exchanger(s) is typically at an elevated temperature relative to the temperature of the ambient air around the work vehicle. For instance, the temperature of the air flowing into the front grille and through the heat exchanger(s) may often be 10-15° C. above the ambient air temperature when the work vehicle is moving in the non-forward or reverse direction. Such hot air recirculation can significantly reduce the cooling performance of the heat exchanger(s), thereby impacting the overall performance of the work vehicle.

Accordingly, a work vehicle having a cooling system that is capable of reversing the airflow through its heat exchanger(s) in order to prevent and/or limit hot air recirculation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a work vehicle including an engine and a hood enclosure at least partially surrounding the engine. The hood enclosure may generally extend between a forward end and an aft end and may include a front grille disposed at the forward end and a secondary grille spaced apart from the front grille. The hood enclosure may also at least partially define an airflow compartment. In addition, the work vehicle may include a heat exchanger disposed in the airflow compartment between the front grille and the engine and at least one cooling fan disposed in the airflow compartment between the heat exchanger and the engine. The at least one cooling fan may generally be configured to generate a reversible airflow within the airflow compartment between the front grille and the secondary grille.

In another aspect, the present subject matter discloses a method for improving the cooling performance of a heat exchanger of a work vehicle, wherein the work vehicle includes an engine and at least one fan disposed between the heat exchanger and the engine. The method may generally include generating an airflow with the at least one fan that is directed through the heat exchanger between a front grill and a secondary grille of the work vehicle and reversing a direction of the airflow through the heat exchanger based on an airflow parameter of the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a work vehicle having a cooling system with a reversible airflow.

Specifically, the cooling system may include one or more heat exchangers and one or more cooling fans configured to direct an airflow through the heat exchanger(s). In several embodiments, the cooling fan(s) may be configured to reverse the direction of the airflow through the heat exchanger(s) based on one or more airflow parameters of the work vehicle, such as the direction of travel of the work vehicle, the speed and/or direction of the wind passing the work vehicle and/or the temperature of air around the work vehicle. By reversing the direction of the airflow through the heat exchanger(s), the overall efficiency and cooling performance of the cooling system may be enhanced.

Figure 1:
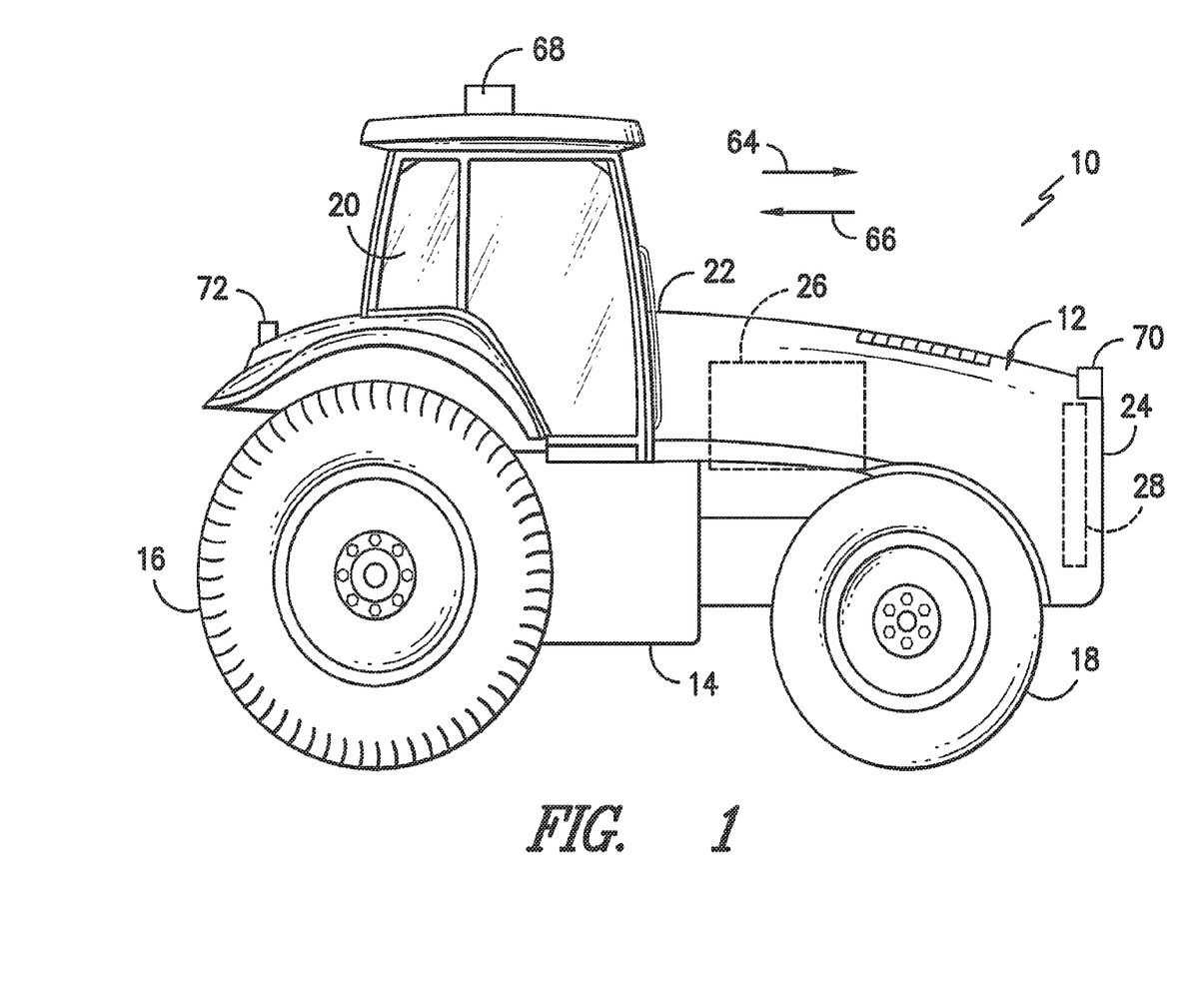
FIG. 1 illustrates a side view of one embodiment of a work vehicle.
Figure 2:
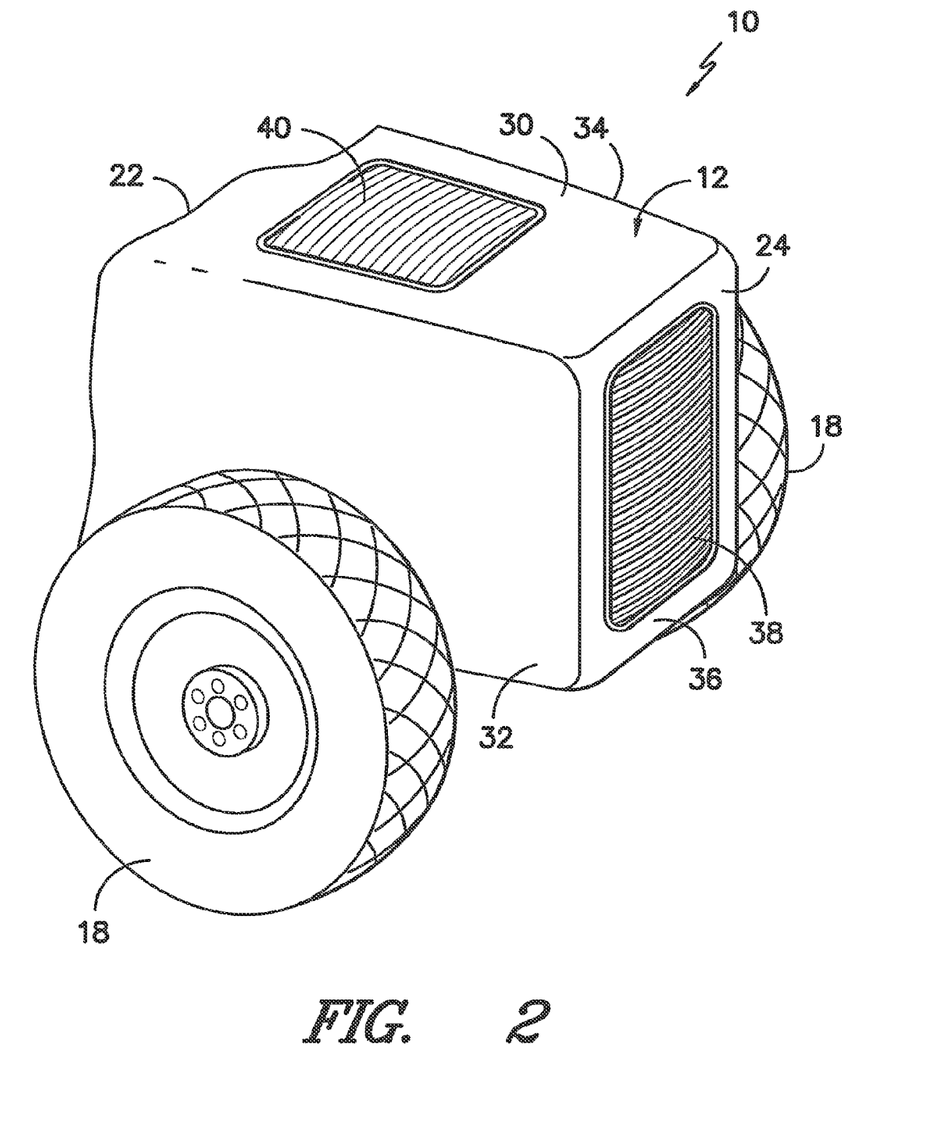
FIG. 2 illustrates a front, perspective view of a hood enclosure of the work vehicle shown in FIG. 1.

Referring now to the drawings, FIGS. 1 and 2 illustrate one embodiment of a work vehicle 10 in accordance with aspects of the present subject matter. In particular, FIG. 1 illustrates a side view of the work vehicle 10 and FIG. 2 illustrates a front, perspective view of a hood enclosure 12 of the work vehicle 10. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown, the work vehicle 10 generally include a chassis or frame 14 that is supported by a pair rear wheels 16 and a pair of front wheels 18, with the rear wheels 16 and/or front wheels 18 being configured as drive wheels. An operator's compartment or cab 20 may be supported along a rear portion of the frame 14 and a hood enclosure 12 may be supported along a front portion of the frame 14. The hood enclosure 12 may generally extend between an aft end 22 disposed adjacent to the cab 20 and a forward end disposed at the front of the work vehicle 10 so as to least partially surround and/or cover an engine 26 and a cooling system 28 of the work vehicle 10.

Figure 5:
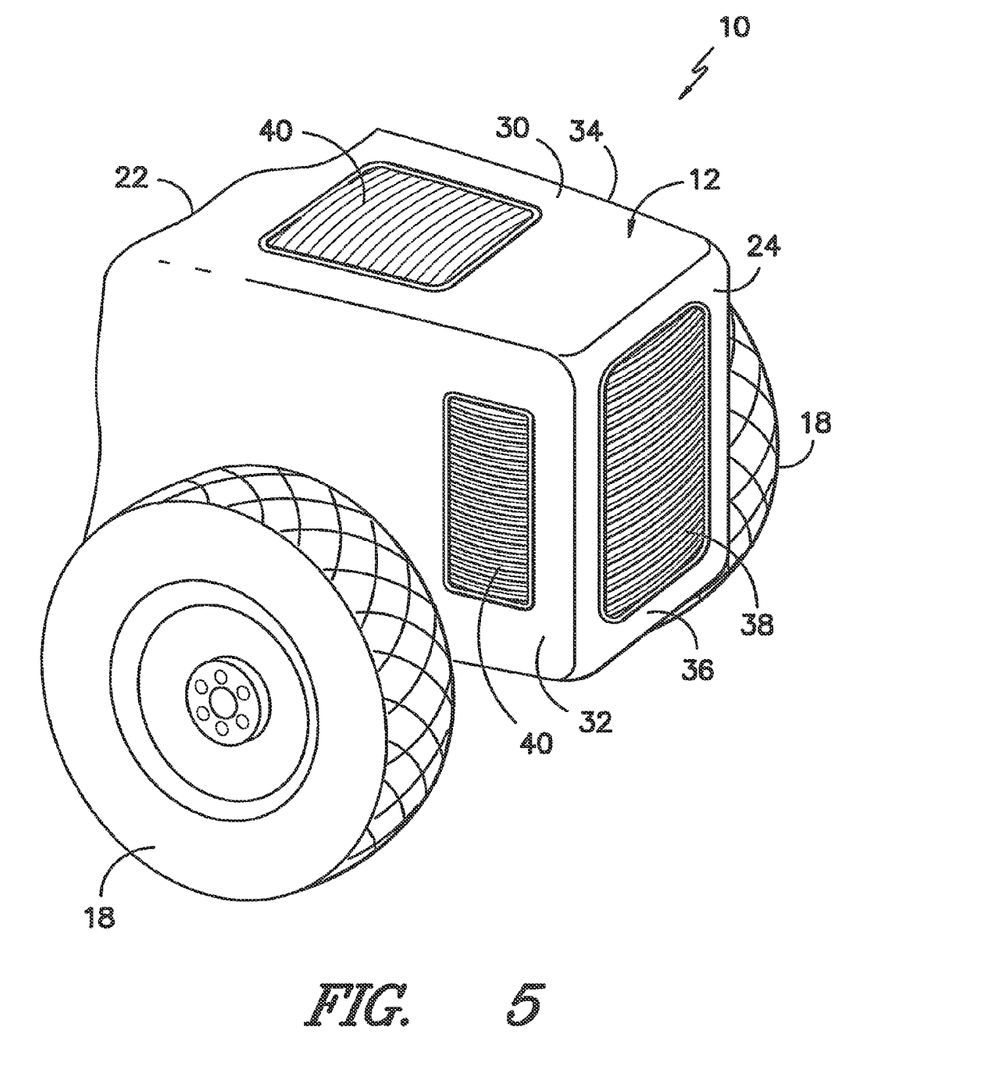
FIG. 5 illustrates a front, perspective view of another embodiment of the hood enclosure of the work vehicle shown in FIG. 1.

As particularly shown in FIG. 2, the hood enclosure 12 may generally include a top wall 30, a first sidewall 32 and a second sidewall 34 extending between its forward and aft ends 22, 24. In addition, the hood enclosure 12 may include a front wall 36 disposed at its forward end 24. Moreover, the hood enclosure 12 may include a front grille 38 forming all or a portion of the front wall 36 and one or more secondary grilles 40 spaced apart from the front grille 38 in the direction of the aft end 22 of the hood enclosure 12. For example, as shown in FIG. 2, the hood enclosure 12 includes a secondary grille(s) 40 forming at least a portion of the top wall 30. In addition to the secondary grille(s) 40 forming at least a portion of the top wall 30 or as an alternative thereto, the hood enclosure 12 may include one or more secondary grilles 40 forming at least a portion of one or both of the sidewalls 32, 34. For instance, in the embodiment shown in FIG. 5, the hood enclosure 12 includes secondary grilles 40 disposed on both the top wall 30 and the sidewalls 32, 34.

It should be appreciated that, as used herein, the term "grille" is used to describe any suitable structure that includes a plurality of openings and/or slits for allowing air to enter and/or exit the hood enclosure 12. Thus, suitable grilles may include, but are not limited to, conventional vehicle grilles, louvers and/or the like and may be configured to have fixed or adjustable grille screens and/or grille bars/slats.

Figure 3:
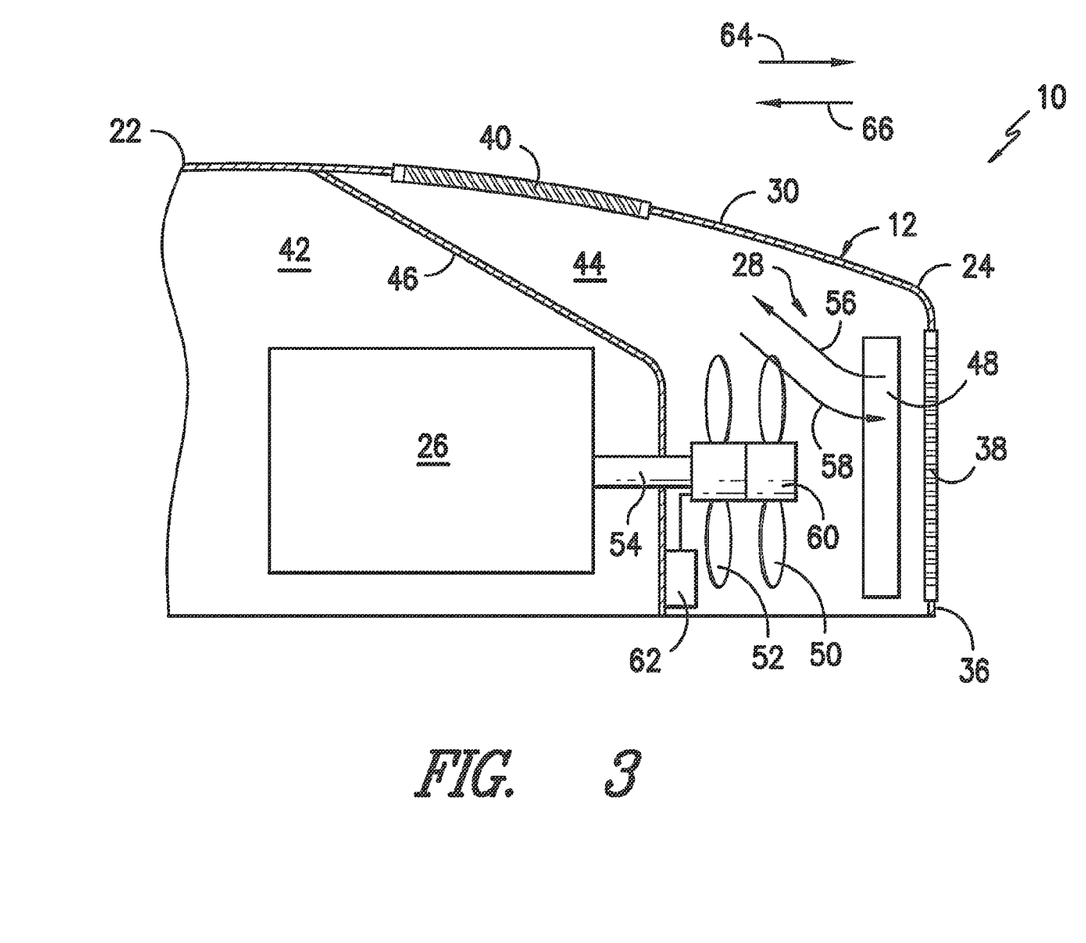
FIG. 3 illustrates a cross-sectional, internal side view of the hood enclosure shown in FIGS. 1 and 2, particularly illustrating one embodiment of a cooling system of the work vehicle.

Referring now to FIG. 3, a cross-sectional, internal side view of the hood enclosure 12 shown in FIGS. 1 and 2 is illustrated in accordance with aspects of the present subject matter, particularly illustrating one embodiment of the cooling system 28 of the work vehicle 10. As shown, the hood enclosure 12 may at least partially define one or more compartments 42, 44 for housing the various components disposed at the front of the work vehicle 10. For example, the hood enclosure 12 may at least partially define an engine compartment 42 extending from the aft end 22 of the hood enclosure 12. The engine compartment 42 may generally be configured to house the engine 26 of the work vehicle 10, as well as any other suitable components (e.g., the transmission and/or the hydraulic system (not shown) of the work vehicle 10). In addition, the hood enclosure 12 may at least partially define an airflow compartment 44 for housing the various components of the cooling system 28. For instance, as shown in FIG. 2, the airflow compartment 44 may be defined at the forward end 24 of the hood enclosure 12 and may extend within the hood enclosure 12 between the front grille 38 and the engine compartment 42.

Additionally, as shown, the work vehicle 10 may also include a wall or baffle 46 extending within the hood enclosure 12 so as to separate the engine compartment 42 from the airflow compartment 44, thereby preventing and/or limiting the amount of air transferred between the two compartments 42, 44. In several embodiments, the baffle 46 may be configured to completely seal off the airflow compartment 44 from the engine compartment 42 to ensure that the cooling air contained within the airflow compartment 44 is not mixed with the heated air contained within the engine compartment 42. Alternatively, the baffle 46 may be configured to permit a portion of the air flowing within the airflow compartment 44 to enter into engine compartment 42 and vice versa. For instance, in one embodiment, one or more openings (not shown) may be defined through the baffle 46 to permit air to be transmitted between the compartments 42, 44.

Referring still to FIG. 3, the cooling system 28 of the work vehicle 10 may generally include one or more heat exchangers 48 disposed between the front grille 38 and the engine 26. For example, as shown in the illustrated embodiment, the heat exchanger(s) 48 may be disposed directly behind the front grille 38. As is generally understood, the heat exchanger(s) 48 may be configured to cool the engine fluid(s) and/or the other fluid(s) utilized during operation of the work vehicle 10 by transmitting such fluid(s) through a plurality of tubes having suitable heat transfer features (e.g., cooling fins, rods, coils and/or the like) so that heat is transferred from the fluid(s) to an airflow passing over and across the tubes. For instance, in several embodiments, the heat exchanger(s) 48 may comprise one or more radiators, intercoolers, fuel coolers, transmission fluid coolers, engine oil coolers and/or the like.

It should be appreciated that, in embodiments in which the cooling system 28 includes more than one heat exchanger 48, the heat exchangers 48 may generally be disposed within the airflow compartment 44 at any suitable location relative to one another. However, in a particular embodiment of the present subject matter, the heat exchangers 48 may be aligned relative to one another so as to have a generally planar orientation at and/or adjacent to the front grille 38, such as by aligning the heat exchangers 48 in a plane that extends generally parallel to the plane defined by the front grille 38.

It should also be appreciated that, in addition to be being disposed directly behind the front grille 38 or as an alternative thereto, one or more of the heat exchangers 48 may be disposed at and/or adjacent to the secondary grille(s) 40. For instance, in the embodiment shown in FIG. 5, one or more heat exchangers 48 may be disposed at and/or adjacent to the front grille 38, the secondary grille 40 disposed on the top wall 30 and/or the secondary grilles 40 disposed on the sidewalls 32, 34 (one of which is shown). As such, in embodiments in which the cooling system 28 includes more than one heat exchanger 48, the heat exchangers 48 may be separated to allow ambient air to be directed through each heat exchanger 48.

In addition, the cooling system 28 may also include one or more cooling fans 50 for generating an airflow through the heat exchanger(s) 48. Specifically, in accordance with aspects of the present subject matter, the cooling fan(s) 50, 52 may be configured to generate a reversible airflow that is directed through the airflow compartment 44 between the front and secondary grilles 38, 40. By providing a reversible airflow through the airflow compartment 44, the cooling performance of the heat exchanger(s) 48 may generally be enhanced. For instance, in several embodiments, the airflow through the airflow compartment 44 may be reversed based on one or more airflow parameters of the work vehicle 10 in order to prevent and/or limit the amount of hot air recirculation within the airflow compartment 44 and/or to otherwise enhance the heat transfer capabilities of the heat exchanger(s) 48. As used herein, the term "airflow parameter" refers to any operating parameter of the work vehicle 10 that relates to the temperature of the air at and/or adjacent to the front grille 38 and/or the secondary grille 40 and/or that may otherwise result in a differential between the temperatures at and/or adjacent to the front and secondary grilles 38, 40. For example, as will be described below, in one embodiment, the cooling fan(s) 50, 52 may be configured to reverse the direction of the airflow based on changes in the direction of travel of the work vehicle 10. In other embodiments, the cooling fan(s) 50, 52 may be configured to reverse the direction of the airflow based on any other suitable airflow parameter, such as wind speed, wind direction and/or air temperature at and/or adjacent to the work vehicle 10.

As shown in FIG. 3, in several embodiments, the cooling system 28 may include first and second cooling fans 50, 52 disposed between the heat exchanger(s) 48 and the engine 26, with each fan 50, 52 being configured to be driven by an output shaft 54 of the engine 26. In general, the first cooling fan 50 may be configured to generate an airflow through the airflow compartment 44 that is directed in a first direction (i.e., from the front grille 38 to the secondary grille 40 and indicated by arrow 56). For instance, in one embodiment, the blades of the first cooling fan 50 may be configured to have a suitable pitch such that, when the first cooling fan 50 is rotated by the output shaft 54, the cooling fan 50 pulls air into the front grille 38 and through the heat exchanger(s) 48 and pushes the air out the secondary grille 40. Additionally, the second cooling fan 52 may be configured to generate an airflow through the airflow compartment 44 that is directed in a second direction (i.e., from the secondary grille 40 to the front grille 38 and indicated by arrow 58). For instance, in one embodiment, the blades of the second cooling fan 52 may be configured to have a suitable pitch such that, when the second cooling fan 52 is rotated by the output shaft, the second cooling fan 52 pulls air into the secondary grille 40 and pushes the air through the heat exchanger(s) 48 and out the front grille 38.

Additionally, in several embodiments, the first and second cooling fans 50, 52 may be configured to be selectively engaged with and disengaged from the output shaft 54 of the engine 26 to permit each cooling fan 50, 52 to be rotated by the output shaft 54 independent of the other cooling fan 50, 52. For instance, as shown in FIG. 3, the first and second cooling fans 50, 52 may be coupled to the output shaft 54 via a coupling device 60. In general, the coupling device 60 may comprise any suitable device and/or combination of devices that is capable of permitting the cooling fans 50, 52 to be independently engaged with and disengaged from the output shaft 54. For example, in one embodiment, the coupling device 60 may comprise one or more electrical clutches and/or gear arrangements configured to independently engage/disengage the cooling fans 50, 52 with/from the output shaft 54

Moreover, as shown in FIG. 3, the coupling device 60 may be communicatively coupled to a controller 62 of the work vehicle 10 to permit the coupling device 60 to automatically engage/disengage the cooling fans 50, 52 with/from the output shaft 54 based on signals transmitted from the controller 62. For instance, when it is desired to provide an airflow through the airflow compartment 44 in the first direction 56, the controller 62 may be configured to transmit a suitable control signal instructing the coupling device 60 to engage the first cooling fan 50 with the output shaft 54 and disengage the second cooling fan 54 from the output shaft 54. Similarly, when it is desired to provide an airflow through the airflow compartment 44 in the second direction 58, the controller 62 may be configured to transmit a suitable control signal instructing the coupling device 60 to engage the second cooling fan 52 with the output shaft 54 and disengage the first cooling fan 50 from the output shaft 54.

It should be appreciated that the controller 62 may generally comprise any suitable computer and/or other processing unit capable of controlling the operation of the cooling fans 50, 52 (e.g., by controlling the operation of the coupling device 60). Thus, the controller 62 may include one or more processor(s) and associated memory device(s) configured to perform any number of computer-implemented functions. Additionally, it should be appreciated that, in one embodiment, the controller 62 may form all or a portion of the overall control system of the work vehicle 10. Alternatively, the controller 62 be configured as a separate controller specifically designed to control the operation of the cooling fans 50, 52.

It should also be appreciated that, in alternative embodiments, the first and second cooling fans 50, 52 need not be coupled coaxially with the output shaft 54. For instance, in one embodiment, the blades of each cooling fan 50, 52 may be mounted onto a separate fan shaft (not shown) extending generally parallel to the output shaft 54. In such an embodiment, the separate fan shaft of each cooling fan 50, 52 may be configured to be selectively engaged with and disengaged from the output shaft 54 via the coupling device 60 (e.g., by using a suitable clutch arrangement, gear arrangement, belt and pulley arrangement and/or the like) to permit the cooling fans 50, 52 to be independently rotated by the output shaft 54.

Additionally, in further embodiments, the cooling system 28 may only include a single cooling fan 50, 52 driven by the output shaft 54 of the engine 26. In such embodiments, the rotation of the cooling fan 50, 52 may be reversible to permit such fan 50, 52 to generate airflows in both the first and second directions 56, 58. For instance, the coupling device 60 may include a suitable clutch and reverse gear arrangement that permits rotation of the cooling fan 50, 52 to be reversed relative to the rotation of the output shaft 54. Alternatively, the cooling fan 50, 52 may be configured as a variable pitch fan having blades with adjustable pitches to allow the airflow through the airflow compartment 44 to be reversed without reversing the rotation of the cooling fan 50, 52. Such variable pitch fans are commercially available and are well known in the fan/propeller art.

Referring still to FIG. 3, as indicated above, in one embodiment, the cooling fan(s) 50, 52 may be configured to reverse the direction of the airflow based on the direction of travel of the work vehicle 10. In particular, when the work vehicle 10 is traveling in an engine-forward direction (indicted by arrow 64), the air around the front grille 38 may generally be at the same temperature as the ambient air out in front of the work vehicle 10. Thus, the controller 62 may be configured to control the operation of the cooling fan(s) 50, 52 (e.g., by engaging the first cooling fan 50 with the output shaft 54) such that the airflow is directed through the airflow compartment 44 in the first direction 56 (i.e., by entering through the front grille 38 and exiting through the secondary grille 40). However, when the work vehicle 10 is traveling in a cab-forward direction (indicted by arrow 66), the air around the front grille 38 may be heated by the wanner air expelled from the engine compartment 42. Accordingly, when travelling in the cab-forward direction 66, the controller 62 may be configured to control the operation of the cooling fan(s) 50, 52 (e.g., by engaging the second cooling fan 52 with the output shaft 54) such that the airflow is directed through the airflow compartment 44 in the second direction 58 (i.e., by entering through the secondary grille 40 and exiting through the front grille 38) in order to prevent the warmed air flowing around the front grille 38 from being pulled into the airflow compartment 44 and directed past the heat exchangers 48. Thus, such a configuration may generally prevent and/or limit the amount of hot air recirculation through the airflow compartment 44, thereby improving the heat transfer capabilities of the heat exchanger(s) 28.

In alternative embodiments, the cooling fan(s) 50, 52 may be configured to reverse the direction of the airflow based on any other suitable airflow parameter of the work vehicle. For example, in one embodiment, operation of the cooling fan(s) 50, 52 may be controlled based on the direction and/or the speed of the wind flowing around and/or adjacent to the work vehicle 10. In such an embodiment, a suitable wind sensor 68 (FIG. 1), such as an anemometer and/or the like, may be mounted on and/or within a portion of the work vehicle 10 (e.g., on top of the cab 20) to permit wind direction and/or wind speed measurements to be obtained. In addition, the wind sensor 68 may be communicatively coupled to the controller 62 via a wired or wireless connection to permit signals associated with the sensor measurements to be transmitted to the controller 62, which may then be used to control the operation of the cooling fan(s) 50, 52. For instance, when the work vehicle 10 and the wind are both traveling/flowing in the engine-forward direction 64, the controller 62 may be configured to control the cooling fan(s) 50, 52 such that the airflow through the airflow compartment 44 is changed from the forward direction 56 to the reverse direction 58 in the event that the wind speed is greater than the travel speed of the work vehicle 10. As such, recirculation of the hot air from the engine compartment that is carried by the wind to the front of the work vehicle may be avoided.

In another embodiment, operation of the cooling fan(s) 50, 52 may be controlled based on the ambient temperature of the air at and/or adjacent to the work vehicle 10. In such an embodiment, one or more suitable temperature sensors 70, 72 may be mounted on and/or within a portion(s) of the work vehicle 10 to permit air temperature measurements to be obtained. For instance, as shown in FIG. 1, a first temperature sensor 70 may be disposed at the front of the work vehicle 10 to obtain temperature measurements of the ambient air located at and/or adjacent to the vehicle's front and a second temperature sensor 72 may be disposed at the rear of the work vehicle 10 to obtain temperature measurements of the ambient air located at and/or adjacent to the vehicle's rear. Each sensor 70, 72 may be configured to transmit temperature measurements to the controller 62 via a wired or wireless connection such that the controller 62 may determine the location of the coolest air relative to the work vehicle 10. For instance, if the temperature measurements indicate that the air around the rear of the work vehicle 10 is cooler than the air around the front of the work vehicle 10, the controller 62 may be configured to control the operation of the cooling fan(s) 50, 52 such that the airflow through the airflow compartment 44 is directed in the second direction 58, thereby drawing in air at a more rearward location along the work vehicle 10 (i.e., through the secondary grille 40).

It should be appreciated that, in further embodiments, operation of the cooling fan(s) 50, 52 may be controlled based on any other suitable airflow parameter of the work vehicle 10, such as operating temperatures within the engine compartment 42, debris amounts within the front and/or secondary grilles 38, 40 and/or the like. In addition, it should be appreciated that operation of the cooling fan(s) 50, 52 may be based on any number and/or combination of the airflow parameters of the work vehicle 10. For instance, in one embodiment, operation of the cooling fan(s) 50, 52 may be based on a combination of the direction of travel of the work vehicle 10 and the speed and/or direction of the wind.

Figure 4:
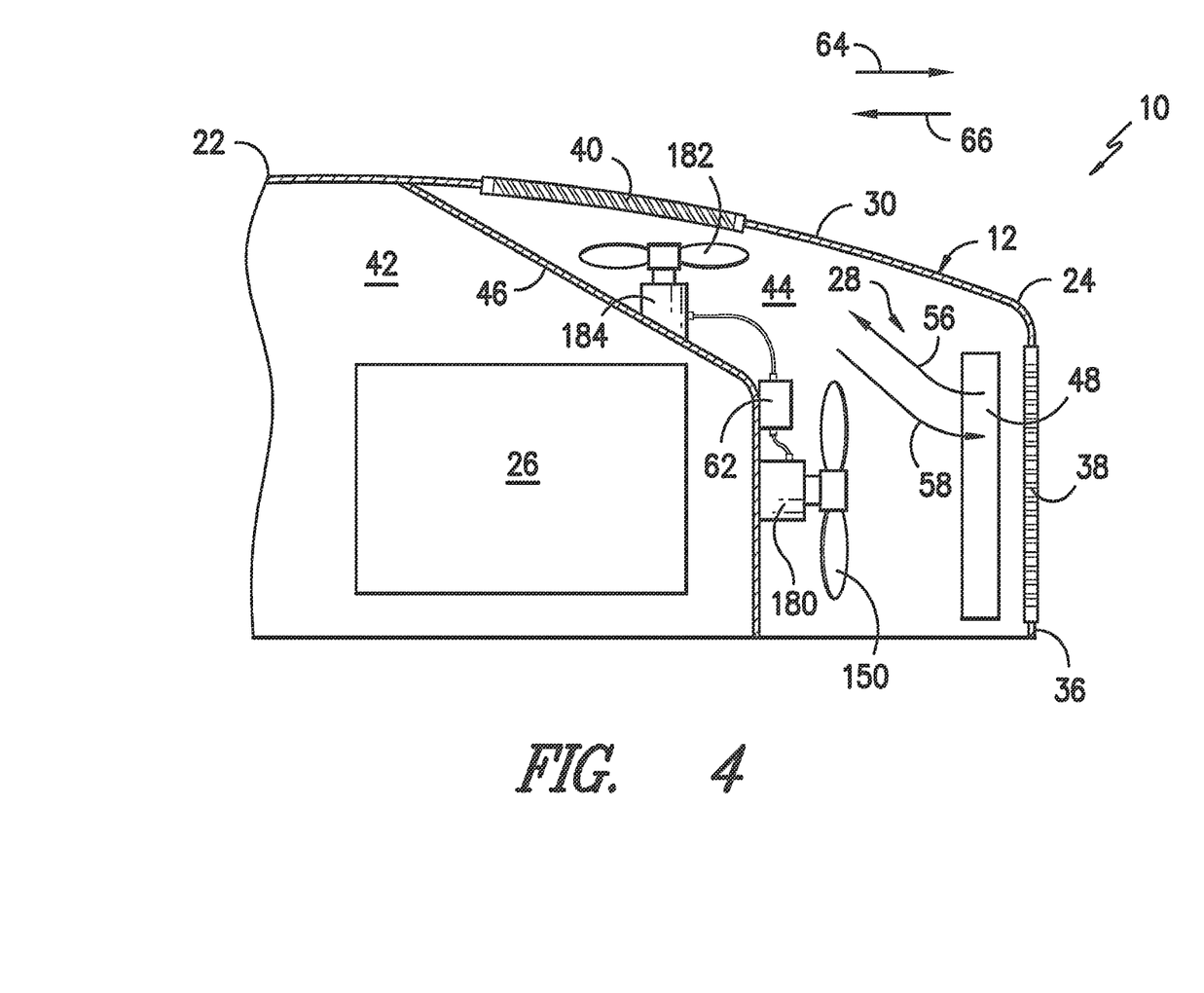
FIG. 4 illustrates a cross-sectional, internal side view of the hood enclosure shown in FIGS. 1 and 2, particularly illustrating another embodiment of a cooling system of the work vehicle.

Referring now to FIG. 4, a cross-sectional, internal side view of another embodiment of the hood enclosure 12 shown in FIGS. 1 and 2 is illustrated in accordance with aspects of the present subject matter, particularly illustrating another embodiment of the cooling system 28 of the work vehicle 10. As shown, unlike the embodiments described above with reference to FIG. 3, the cooling fan(s) 150 may be driven by a drive source other than the engine 28, such as a separate drive motor 180. In general, the drive motor 810 may be mounted within a portion of the hood enclosure 12 (e.g., within the airflow compartment 44) and may be configured to facilitate rotation of the cooling fan(s) 150. In several embodiments, the drive motor 180 may comprise a reversible motor (e.g., a reversible electrical motor, a reversible hydraulic motor and/or the like) that is capable of rotating the cooling fan(s) 150 in both clockwise and counter-clockwise directions so that the direction of the airflow through the airflow compartment 44 may be reversed. Alternatively, the drive motor 180 may be configured to rotate the cooling fan(s) 150 in a single direction. In such an embodiment, the cooling fan(s) 150 and/or the drive motor 180 may have a similar arrangement to the embodiments described above with reference to FIG. 3, such as by coupling differentially pitch cooling fans (e.g., the first and second cooling fans 50, 52) to the output shaft of the drive motor 180 via a coupling device 60 and/or by configured the cooling fan(s) 150 as variable pitch fan(s).

Additionally, similar to the embodiment described above, the drive motor 180 may be communicatively coupled to a controller 62 via a wired or wireless connection to allow the operation of the cooling fan(s) 150 to be controlled. For instance, the controller 62 may be configured to control the operation of the drive motor 180 and/or the cooling fan(s) 150 based on one or more airflow parameters of the work vehicle 10 in order to maximize the efficiency of the heat exchanger(s) 48.

Referring still to FIG. 4, in addition to the cooling fan(s) 50, 52, 150 described above, the work vehicle 10 may also include one or more auxiliary fans 182 to further enhance the airflow through the airflow compartment 44. For instance, as shown in the illustrated embodiment, an auxiliary fan(s) 182 may be disposed at and/or adjacent to the secondary grille 40 to provide an additional source for drawing air through and/or expelling air out of the secondary grille 40, depending on the desired direction of the airflow. In such an embodiment, the auxiliary fan(s) 182 may be driven by an auxiliary drive motor 184 (configured the same as or similar to drive motor 180 described above) and may be communicatively coupled to the controller 62 to allow control of its operation. Alternatively, an auxiliary fan(s) 182 may be disposed at any other suitable location with the airflow compartment 44, such as by being located between the front grille 38 and the heat exchanger(s) 48, and may be driven by any suitable drive source, such as another auxiliary drive motor 184 or the output shaft 54 of the engine 26.

It should be appreciated that the present subject matter is also directed to a method for improving the cooling performance of the heat exchanger(s) 48 of a work vehicle 10. In several embodiments, the method may include generating an airflow with one or more cooling fan(s) 50, 52, 150 that is directed through the heat exchanger(s) 48 between the front and secondary grilles 38, 40 and reversing the direction of the airflow through the heat exchanger(s) 48 based on an airflow parameter of the work vehicle 10. For instance, as described above, the controller 62 of the work vehicle 10 may be configured to control the operation of the cooling fan(s) 50, 52, 150 such that the airflow through the airflow compartment 44 is directed in the first direction 56 when the work vehicle 10 is travelling in the engine-forward direction 64 and is directed in the second direction 58 when the work vehicle 10 is travelling in the cab-forward direction 66. As such, the direction of the airflow through the airflow compartment 44 may be controlled so as to prevent and/or limit the amount of hot air recirculation, thereby enhancing the overall performance of the heat exchanger(s) 48.

Additionally, it should be appreciated that, in several embodiments, one or more of the components of the work vehicle 10 described herein may form all or part of a kit (e.g., a retro-fit and/or field kit) for retro-fitting and/or modifying existing and/or future work vehicles. For example, in one embodiment, the cooling fan(s) 50, 52, 150, drive motor(s) 180, 184, coupling device 60, controller 62 and/or grilles 38, 40 may form all or part of a kit to be used with existing and/or future work vehicles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A work vehicle, comprising:
   an engine;
   a hood enclosure at least partially surrounding the engine and extending between a forward end and an aft end, the hood enclosure including a front grille disposed at the forward end and a secondary grille spaced apart from the front grille, the hood enclosure at least partially defining an airflow compartment;
   a heat exchanger disposed in the airflow compartment between the front grille and the engine; and
   at least one cooling fan disposed in the airflow compartment between the heat exchanger and the engine, the at least one cooling fan being configured to generate an airflow within the airflow compartment between the front grille and the secondary grille, an operation of the at least one cooling fan being controlled so as to vary a flow direction of the airflow between the front grille and the secondary grille based on changes in an airflow parameter of the work vehicle,
   wherein the airflow parameter includes at least one of wind speed, wind direction, air temperature at the work vehicle, or a direction of travel of the work vehicle.

2. The work vehicle of claim 1, wherein the at least one fan is driven by an output shaft of the engine.

3. The work vehicle of claim 2, wherein the at least one fan comprises a first fan and a second fan, the first fan being configured to be selectively engaged with the output shaft such that the airflow flows in a first direction from the front grille to the secondary grille and the second fan being configured to be selectively engaged with the output shaft such that the airflow flows in a second direction from the secondary grille to the front grille.

4. The work vehicle of claim 3, wherein the first and second fans are coupled to the output shaft via a coupling device.

5. The work vehicle of claim 1, wherein the at least one fan comprises a variable pitch fan.

6. The work vehicle of claim 1, further comprising a drive motor coupled to the at least one fan.

7. The work vehicle of claim 6, wherein the drive motor comprises a reversible drive motor.

8. The work vehicle of claim 1, further comprising a controller configured to control the operation of the at least one fan based on the airflow parameter of the work vehicle.

9. The work vehicle of claim 8, further comprising at least one sensor communicatively coupled to the controller, the at least one sensor being configured to measure at least one of the wind speed, the wind direction, or the air temperature.

10. The work vehicle of claim 1, wherein the engine is housed within an engine compartment at least partially defined by the hood enclosure and further comprising a baffle separating the airflow compartment from the engine compartment.

11. The work vehicle of claim 1, wherein the secondary grille forms part of at least one of:
    a top wall of the hood enclosure; or
    a side wall of the hood enclosure.

12. The work vehicle of claim 1, further comprising an auxiliary fan spaced part from the at least one cooling fan.

13. The work vehicle of claim 12, wherein the auxiliary fan is disposed at or adjacent to the secondary grille.

14. A work vehicle, comprising:
    an engine including an output shaft;
    a hood enclosure at least partially surrounding the engine and extending between a forward end and an aft end, the hood enclosure including a front grille disposed at the forward end and a secondary grille spaced apart from the front grille, the hood enclosure at least partially defining an airflow compartment;
    a heat exchanger disposed in the airflow compartment between the front grille and the engine; and
    first and second fans disposed in the airflow compartment between the heat exchanger and the engine, the first and second fans being configured to generate an airflow within the airflow compartment between the front grille and the secondary grille, wherein the first fan is configured to be selectively engaged with the output shaft of the engine such that the airflow generated by the first fan flows in a first direction from the front grille to the secondary grille, wherein the second fan is configured to be selectively engaged with the output shaft of the engine such that the airflow generated by the second fan flows in a second direction from the secondary grille to the front grille.

15. The work vehicle of claim 14, wherein the first and second fans are coupled to the output shaft via a coupling device.

16. The work vehicle of claim 15, further comprising a controller communicatively coupled to the coupling device, the controller being configured to control an operation of the coupling device to selectively engage either the first fan or the second fan with the output shaft of the engine.

17. The work vehicle of claim 15, wherein the controller is configured to control the operation of the coupling device based on changes in an airflow parameter of the work vehicle, the airflow parameter including at least one of wind speed, wind direction, air temperature at the work vehicle, or a direction of travel of the work vehicle.

* * * * *